(12) United States Patent
Tawade et al.

(10) Patent No.: US 11,940,038 B2
(45) Date of Patent: *Mar. 26, 2024

(54) CLUTCH PACK WITH LOCK PLATES

(71) Applicant: Eaton Intelligent Power Limited, Dublin (IE)

(72) Inventors: Sagar Pratap Tawade, Thane (IN); Rupesh Madhukar Surve, Pune (IN)

(73) Assignee: Eaton Intelligent Power Limited, Dublin (IE)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,993

(22) Filed: Apr. 5, 2023

(65) Prior Publication Data

US 2023/0243407 A1 Aug. 3, 2023

Related U.S. Application Data

(63) Continuation of application No. 17/422,234, filed as application No. PCT/EP2020/050559 on Jan. 10, 2020, now Pat. No. 11,655,887.

(30) Foreign Application Priority Data

Jan. 10, 2019 (IN) .............................. 201911001157

(51) Int. Cl.
*F16H 48/08* (2006.01)
*F16D 23/12* (2006.01)
(Continued)

(52) U.S. Cl.
CPC ............. *F16H 48/08* (2013.01); *F16H 48/22* (2013.01); *F16H 48/24* (2013.01);
(Continued)

(58) Field of Classification Search
CPC ........ F16H 48/22; F16H 48/24; F16H 48/295; F16H 2048/208
See application file for complete search history.

(56) References Cited

U.S. PATENT DOCUMENTS

| 3,606,803 A | 9/1971 | William |
| RE28,004 E | 5/1974 | Ottemann |

(Continued)

FOREIGN PATENT DOCUMENTS

| DE | 102015120818 A1 | 6/2017 |
| JP | H 06213289 A | 8/1994 |
| WO | WO 2020002412 A1 | 1/2020 |

OTHER PUBLICATIONS

International Search Report and Written Opinion received for PCT/EP2020/050559, pp. 1-9, dated Feb. 24, 2020.

*Primary Examiner* — Ernesto A Suarez
*Assistant Examiner* — James J Taylor, II
(74) *Attorney, Agent, or Firm* — Baker Botts L.L.P.

(57) ABSTRACT

A differential comprises a case and a side gear. The differential further comprises a lockout mechanism having a first lock plate comprising a first side and a toothed side; a second lock plate comprising a first side facing the case and a toothed second side facing the toothed side of the first lock plate; a cam plate axially between the side gear and the first lock plate; and a clutch pack axially between the cam plate and the first lock plate. The differential further comprises an engagement mechanism configured to actuate the cam plate to rotate.

16 Claims, 8 Drawing Sheets

(51) Int. Cl.
   *F16H 48/20*   (2012.01)
   *F16H 48/22*   (2006.01)
   *F16H 48/24*   (2006.01)
   *F16H 48/295*  (2012.01)

(52) U.S. Cl.
   CPC .. *F16D 2023/123* (2013.01); *F16H 2048/208* (2013.01); *F16H 48/295* (2013.01)

(56) References Cited

U.S. PATENT DOCUMENTS

| | | | |
|---|---|---|---|
| 3,831,462 | A | 8/1974 | Baremor |
| 3,893,351 | A * | 7/1975 | Baremor ................. F16H 48/22 475/234 |
| 4,238,013 | A | 12/1980 | Goscenski |
| 4,266,445 | A | 5/1981 | Goscenski |
| 5,007,886 | A | 4/1991 | Holmquist |
| 5,484,347 | A | 1/1996 | Holmquist |
| 6,319,166 | B1 | 11/2001 | Kyle |
| 7,438,661 | B2 | 10/2008 | Kyle |
| 8,167,763 | B2 | 5/2012 | Curtis |
| 9,400,044 | B2 | 7/2016 | Wadhva |
| 11,118,664 | B2 | 9/2021 | Zink |
| 11,221,065 | B2 * | 1/2022 | Zink ....................... F16H 48/24 |
| 2006/0073931 | A1 | 4/2006 | Teraoka |
| 2021/0293316 | A1 | 9/2021 | Hirota |

* cited by examiner

CLUTCH PACK WITH LOCK PLATES

PRIORITY

This is a continuation application claiming the benefit of U.S. Ser. No. 17/422,234, filed Jul. 12, 2021, which is a US § 371 National Stage Entry of PCT/EP2020/050559 filed Jan. 10, 2020, claiming the benefit of Indian provisional application 201911001157 filed Jan. 10, 2019 all of which are incorporated herein by reference.

TECHNICAL FIELD

This application relates to clutch packs, and more particularly to clutch packs with lock plates for use in, for example, mechanical locking differentials.

BACKGROUND

A mechanical locking differential automatically locks a differential when a predetermined traction condition is encountered (e.g., a difference in wheel speed exceeding a predetermined valve). A mechanical locking differential typically uses an active clutch pack having a large number of clutch discs to provide the required torque capacity from the ring gear to the wheels and to smoothen the locking action. Such a large number of clutch discs may result in an extended bearing span.

In certain applications, it may be desirable to decrease the bearing span with smaller axial width. Reducing the number of clutch discs, however, may not be desirable because it can reduce the torque capacity and thereby prevent the smooth locking action.

SUMMARY

The apparatus and related methods disclosed herein may overcome one or more of the above-discussed disadvantages and improve the art by way of a combination of a clutch pack and a pair of lock plates.

To attain the advantages and in accordance with the purpose of the disclosure, as embodied and broadly described herein, one aspect of the disclosure may provide a differential comprising a case, a side gear, a first lock plate comprising a first side and a toothed side, a second lock plate comprising a first side facing the case and a toothed second side facing the toothed side of the first lock plate. The differential can further comprise a cam plate between the side gear and the first lock plate and a clutch pack between the cam plate and the first lock plate. The cam plate can comprise a splined neck extending towards the first lock plate, and the clutch pack can comprise at least one active clutch disc internally splined to the splined neck.

Another exemplary aspect can provide a differential that comprises a case comprising a guide groove, a side gear comprising external splines, a first lock plate comprising internal splines configured to engage the external splines of the side gear, and a second lock plate configured to mate with the first lock plate. The differential can also comprise a cam plate comprising a neck extending from a side surface facing the first lock plate. The neck can comprise external splines. The differential can further comprise a clutch pack between the cam plate and the first lock plate, where the clutch pack can comprise at least one first clutch disc having an ear configured to fit into the guide groove of the case and a second clutch disc internally splined to the external splines of the neck.

According to still another exemplary aspect, a differential can comprise a case comprising a first end and a second end opposite to the first end, a first side gear comprising exterior splines, and a second side gear comprising exterior splines. The differential can also comprise a first lock plate comprising a first side and a toothed side, a second lock plate comprising a first side facing the second end of the case and a toothed second side facing the toothed side of the first lock plate, and a cam plate between the side gear and the first lock plate. The cam plate can comprise a splined neck extending towards the first lock plate. The differential can further comprise a first clutch pack between the cam plate and the first lock plate and a second clutch pack between the first side gear and the first end of the case. The first clutch pack can comprise at least one active clutch disc internally splined to the splined neck, and the second clutch pack can comprise at least one active clutch disc internally splined to the external splines of the first side gear.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

It is to be understood that both the foregoing general description and the following detailed description are exemplary and explanatory only and are not restrictive of the claimed invention.

BRIEF DESCRIPTION OF THE DRAWINGS

The accompanying drawings, which are incorporated in and constitute a part of this specification, illustrate an exemplary embodiment of the invention and together with the description, serve to explain the principles of the invention.

DETAILED DESCRIPTION

Reference will now be made in detail to the exemplary embodiments which are illustrated in the accompanying drawings. Wherever possible, the same reference numbers will be used throughout the drawings to refer to the same or like parts. Directional references such as "left" and "right" are for ease of reference to the figures.

While the exemplary embodiment of the invention will be described in connection with a particular mechanical locking differential, it should be understood that the invention can be applied to, or used in connection with, any other types of locking differentials or any other suitable mechanical devices utilizing a clutch pack.

Figure 1:
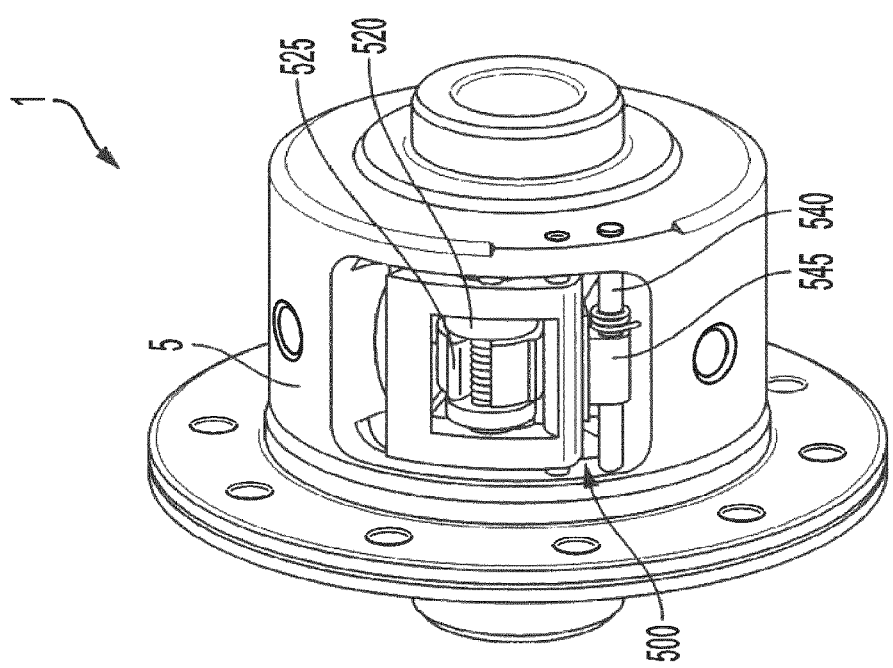
FIG. 1 is a perspective view of a mechanical differential.
Figure 2:
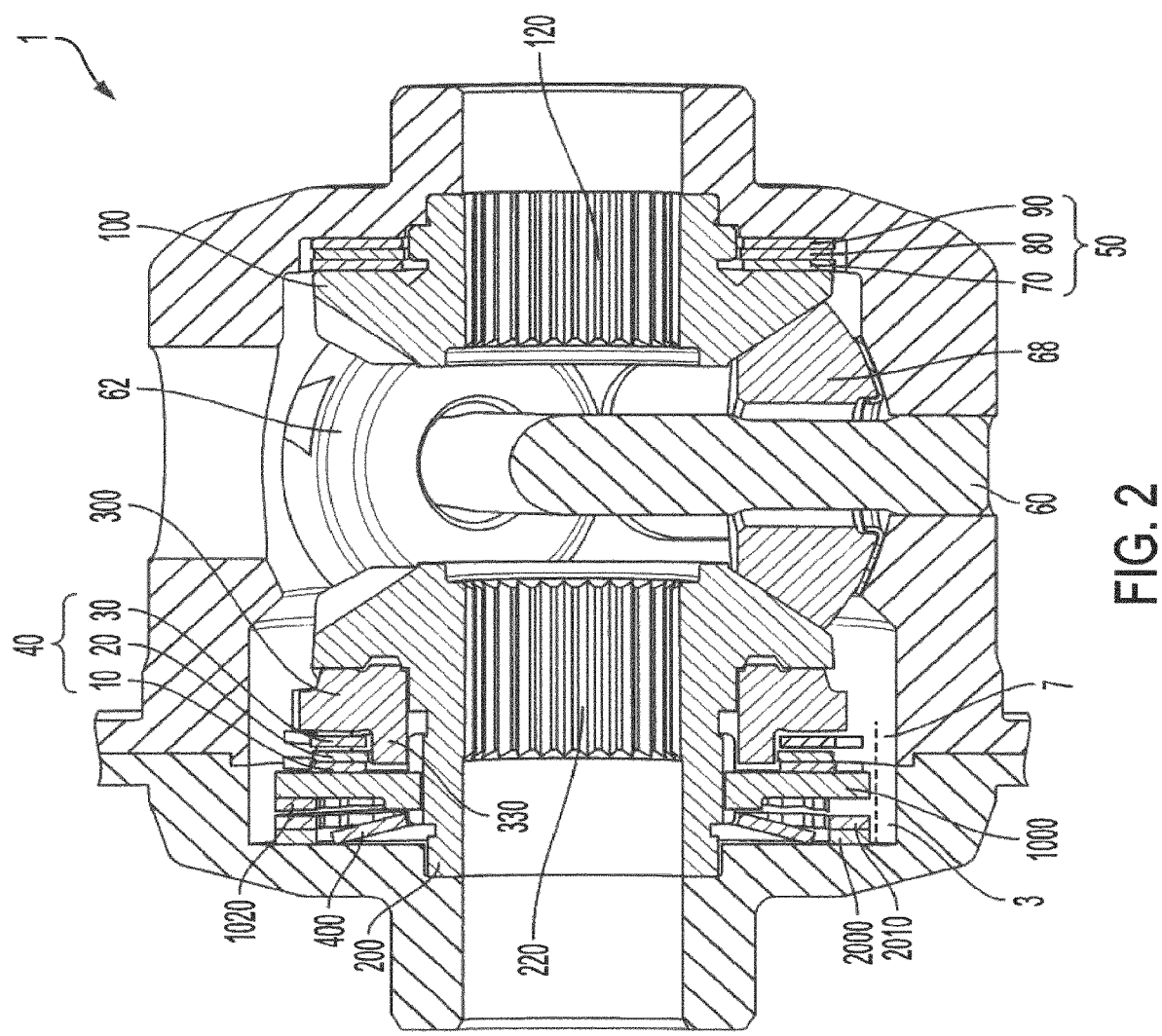
FIG. 2 is a cross-sectional view of the mechanical differential of FIG. 1.
Figure 3:
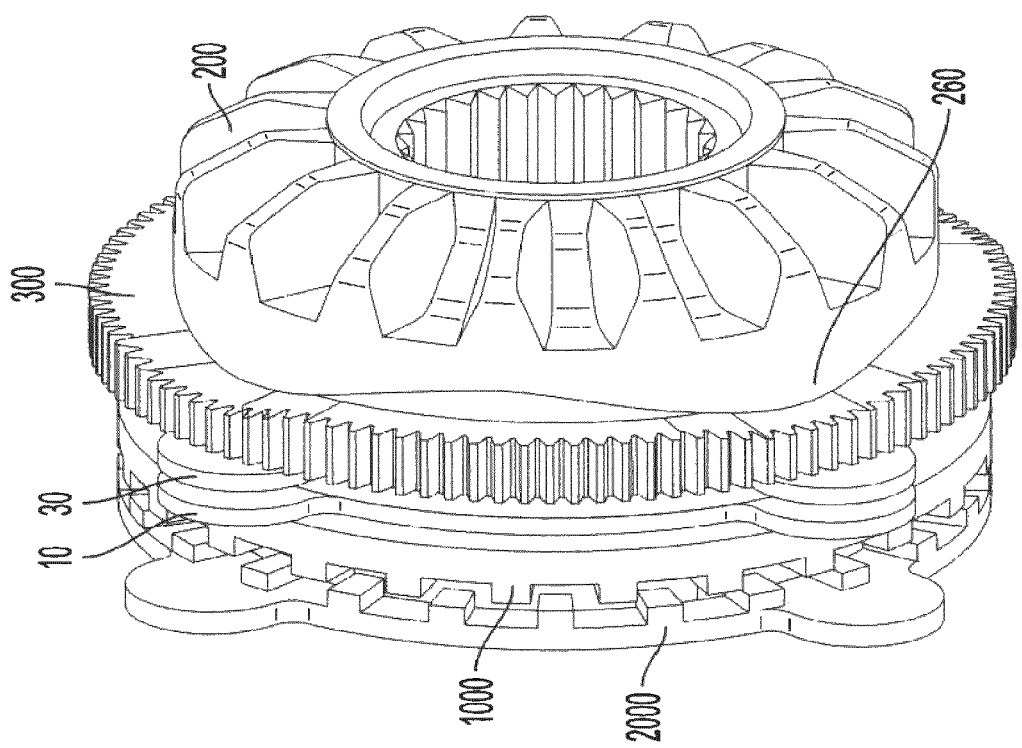
FIG. 3 is a perspective view of a lockup mechanism of the mechanical differential of FIG. 2.

FIGS. 1 and 2 illustrate an example of a mechanical locking differential 1 configured to allow two wheels on a motor vehicle to operate at different speeds and maintain free differential action (i.e., unlocked mode). However, if one wheel begins to slip, the drive axle can be automatically and fully locked side to side, causing the wheels to rotate at the same speed and thereby providing full power to both wheels (i.e., locked mode). Such a mechanical locking differential uses a mechanical device, as opposed to an electrical or hydraulic device, to go between the locked mode and the unlocked mode. In various exemplary embodiments, the mechanical device consistent with the present disclosure can comprise one or more components described in U.S. Pat. Nos. 6,319,166, 7,438,661, 8,167,763, and 9,400,044, assigned to Eaton Corporation and incorporated herein by reference in their entireties.

Differential 1 can include a case 5 configured to house various components of differential 1. Torque from a vehicle driveline can be transferred to differential 1 via an input gear (e.g., ring gear) (not shown). The input gear can be integrally formed with or attached to case 5 by suitable attachment mechanisms (e.g., bolts). The input gear can be in toothed engagement with an input pinion gear (not shown), which receives input drive torque from the vehicle driveline.

Figure 9B:
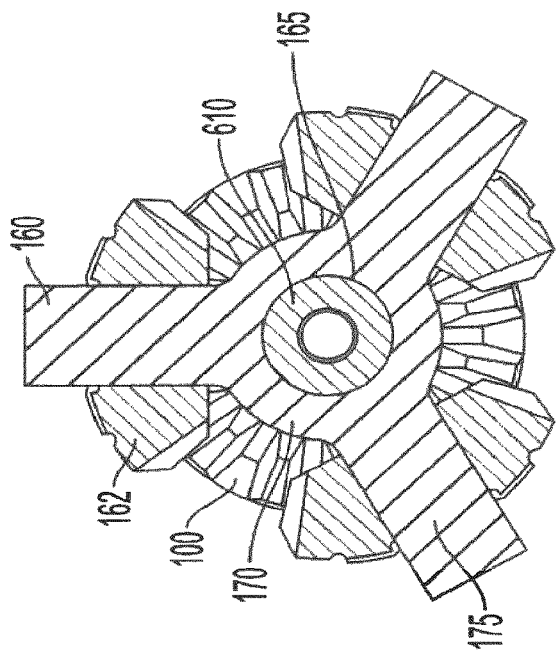
FIG. 9B is a plan view of FIG. 9A along plane 9C.
Figure 9C:
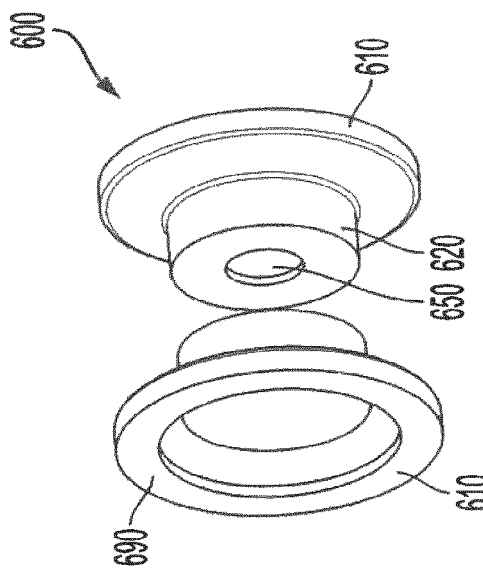
FIG. 9C is a perspective view of the reaction block of FIG. 9A.
Figure 9A:
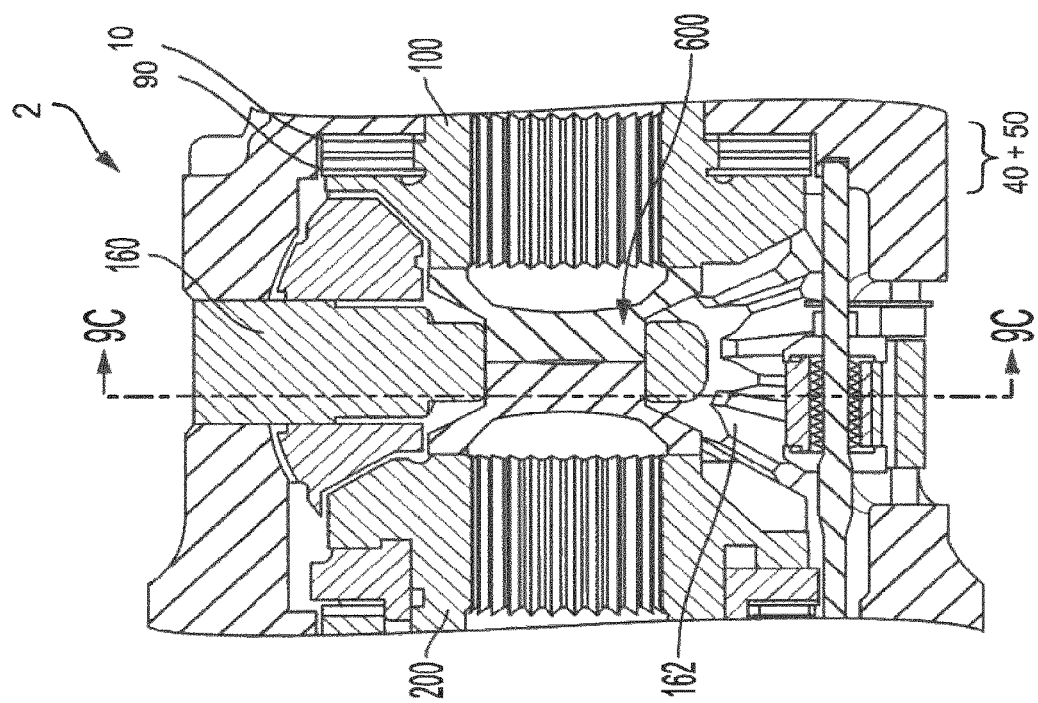
FIG. 9A is a cross-section view of a mechanical differential, illustrating an exemplary reaction block.

Differential 1 can further include a differential gear set disposed inside case 5. In particular, differential 1 can include two side gears 100, 200 (i.e., hereinafter individually referred to as right side gear 100 and left side gear 200), a pinion shaft 60, and one or more pinion gears 62, 68 rotatably mounted on pinion shaft 60. Pinion shaft 60 can be attached to case 5 and connected to the input pinion gear. Pinion shaft 60 can be a cylindrical rod or, as shown in FIGS. 9A-9C, a cross-shaft 160 having a number of arms 175 corresponding to the number of pinion gears 162 mounted on pinion shaft 160. It should be understood that any other suitable pinion shaft configuration known in the art can be used additionally or alternatively.

Side gears 100, 200 can be in splined engagement with a pair of axle shafts (not shown) of a motor vehicle. For example, each of side gears 100, 200 can have an internal spline 120, 220, and the respective axle shaft can include a corresponding external spline (not shown), such that the torque of side gears 100, 200 can be transferred to the respective axle shafts.

Pinion gears 62, 68 can be meshed with side gears 100 and 200, so that the power transferred from the engine to pinion shaft 60 can flow to the left and right axle shafts. For example, as pinion shaft 60 rotates, pinion gears 62 and 68 can transfer differentiated or undifferentiated torque to meshed side gears 100 and 200. Torque can then be transferred to the respective axle shafts via the splined engagement therebetween and to the wheels associated with the axle shafts. Since this torque path, as well as rear wheel drive (RWD) and all-wheel drive (AWD or 4WD) torque paths, are known, the vehicle driveline is not illustrated. Despite the specific reference to FWD, RWD, and AWD systems, it is to be understood that differential 1 of the present disclosure can be used in any suitable environment requiring a differential rotation for two axle shafts.

During normal, straight-ahead operation of a motor vehicle, there may be limited differentiating action (e.g., substantially no differentiating action) that may occur between the left and right axle shafts, and pinion gears 62 and 68 may not rotate relative to pinion shaft 60. Accordingly, case 5, pinion gears 62 and 68, side gears 100 and 200, and the axle shafts all rotate about the same axis of rotation of the axle shafts, as a single solid unit. Under certain operating conditions, such as when the vehicle is turning, a certain amount of differentiating action may occur between side gears 100 and 200, up to a predetermined level of speed difference (e.g., a difference of about 100 RPM between right side gear 100 and left side gear 200). Above that predetermined level, it can be desirable to retard the relative rotation between side gears 100 and 200 to prevent excessive differentiating action between the axle shafts.

Figure 4C:
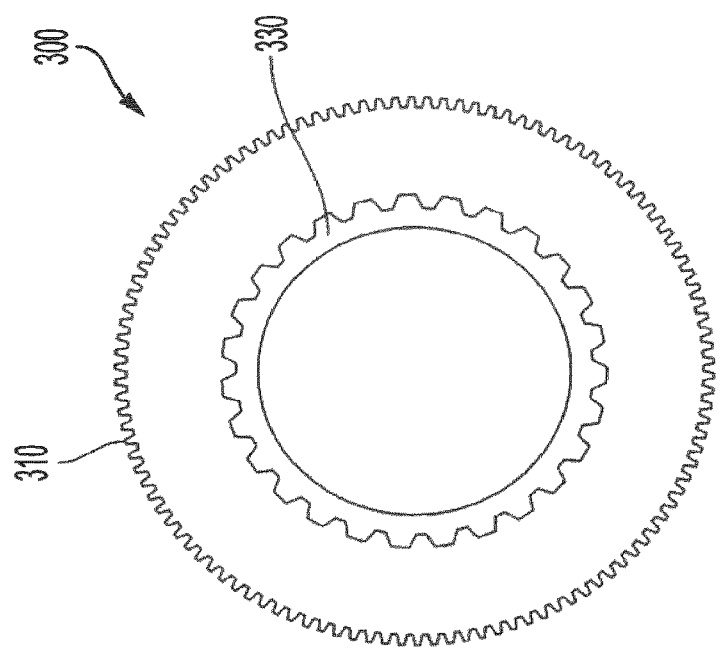
FIG. 4C is a plan view of a second side, opposite to the first side, of the cam plate of FIG. 4A.
Figure 4B:
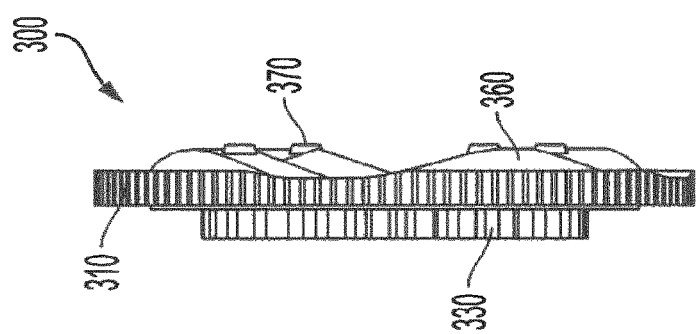
FIG. 4B is a side view of the cam plate of FIG. 4A.
Figure 4A:
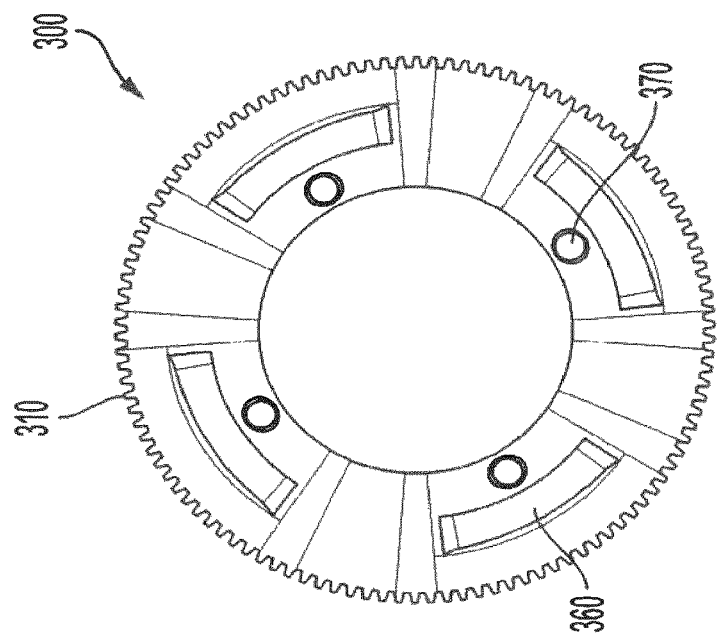
FIG. 4A is a plan view of a first side of a cam plate.
Figure 6:
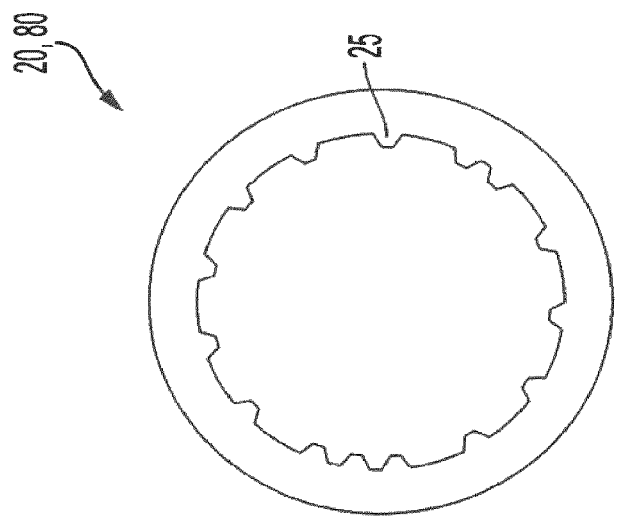
FIG. 6 is a plan view of an internally splined active disc.

To retard differentiating action between the axle shafts, differential 1 can include a lockup mechanism for locking up the differential gear set and an actuator for actuating the lockup mechanism. The lockup mechanism can include a combination of a clutch pack 40 and a pair of lock plates 1000, 2000 movably associated with a cam plate 300. As shown in FIGS. 4A-4C, cam plate 300 can define a set of external teeth 310 extending from its radial outer surface. Cam plate 34 can also define a plurality of ramps 360 and a plurality of detents 370 (e.g., protrusions) on a cam surface facing left side gear 200. Left side gear 200 can also define a cam surface (i.e., the backside of left side gear 200) with a plurality of corresponding ramps 260 and a plurality of corresponding detent-receiving holes (not shown) machined into the cam surface. Ramps 260 on left side gear 200 can mate between corresponding ramps 360 on cam plate 300. The holes on the cam surface of left side gear 200 can prevent cam plate 300 from ramping until a predetermined torque is applied at external teeth 310 of cam plate 300.

In some exemplary embodiments, detents 370 of cam plate 300 and the corresponding holes of left side gear 200 can be interchanged. For example, detents 370 can be formed on the cam surface of left side gear 200, and the corresponding holes can be formed on the cam surface of cam plate 300.

Cam plate 300 can also comprise a neck 330 extending from a side surface opposite to the cam surface. Neck 330 can include external splines (e.g., including teeth extending radially outwardly from an outer surface of neck 330), as best shown in FIGS. 4B and 4C. One or both of ramps 360 of cam plate 300 and ramps 260 of left side gear 200 can comprise stepwise transitions or smooth transitions. Further, while four ramps 360, 260 are shown in FIGS. 4A and 4B, more or fewer ramps can be used. Similarly, detents 370 of cam plate 300 and/or the corresponding holes of side gear 200 can have more or fewer than four shown in the figures. The configurations of cam plate 300 and side gear 200 and their relationship can be further understood from examples described in, for example, U.S. Pat. Nos. 3,606,803, 3,831, 462, 5,484,347, 6,319,166, RE 28,004, U.S. Pat. Nos. 8,167, 763 and 9,400,044, incorporated herein by reference in their entirety.

To actuate the lockup mechanism to lock differential 1, any suitable actuator known in the art, such as those described in U.S. Pat. Nos. 8,167,763 and 9,400,044, can be used. For example, as shown in FIG. 1, actuator 500 can include a combination of an engagement mechanism 520 and a lockout mechanism 540. Engagement mechanism 520 can comprise a pair of flyweights 525 spring-loaded on a first shaft that is meshed and rotates with external teeth 310 of cam plate 300. When the first shaft rotates due to differential action and the rotational speed exceeds above a predetermined value (e.g., a difference of about 100 RPM), the centrifugal force of flyweights 525 overcomes the spring force and causes them to swing out to engage a pawl 545 of lockout mechanism 540 on a second shaft. One flyweight 525 can be configured to engage pawl 545 in one direction of rotation while the other flyweight 525 can be configured to engage pawl 545 in the opposite direction. The locking between flyweights 525 and pawl 545 can create a force exerted on external teeth 310 of cam plate 300 that causes cam plate 300 to rotate out of the detent position and into the ramping position, thereby initiating the locking mode. Because differential 1 may not lock at above a predetermined speed (e.g., 20 mph), lockout mechanism 540 can be configured to cause pawl 545 to rotate away from engagement mechanism 520 when the vehicle travels over the predetermined speed. Since actuator 500 of the present disclosure can be substantially similar to those described in the above-mentioned references, any additional details thereof is omitted herein.

Now with reference to FIGS. 5, 6, 7A-B, and 8A-B, the lockup mechanism employing a combination of clutch pack 40 and a pair of lock plates 1000 and 2000 for use in, for example, a mechanical locking differential is described herein. As best shown in FIG. 2, the lockup mechanism of differential 1 can include a pair of first lock plate 1000 and second lock plate 2000 associated with left side gear 2000 and clutch pack 40 disposed between first lock plate 1000 and cam plate 300. The lockup mechanism can also include another clutch pack 50 associated with right side gear 100.

Clutch packs in a mechanical locking differential have two main functions: (1) to transfer whole torque from an input gear (e.g., ring gear) to the wheels of a motor vehicle when the differential is locked; and (2) to smoothen the locking action by slippage of the clutch itself. As will be evident from the description that follows, when lock plates 1000 and 2000 are used along with clutch packs 40 and 50 according to the present disclosure, the overall number of clutch discs required to maintain the torque capacity can be reduced, which in turn can reduce the bearing span. Accordingly, conventional clutch packs can be replaced with a combination of reduced-size clutch packs 40, 50 and locking plates 1000 and 2000 to reduce bearing span.

Figure 7B:
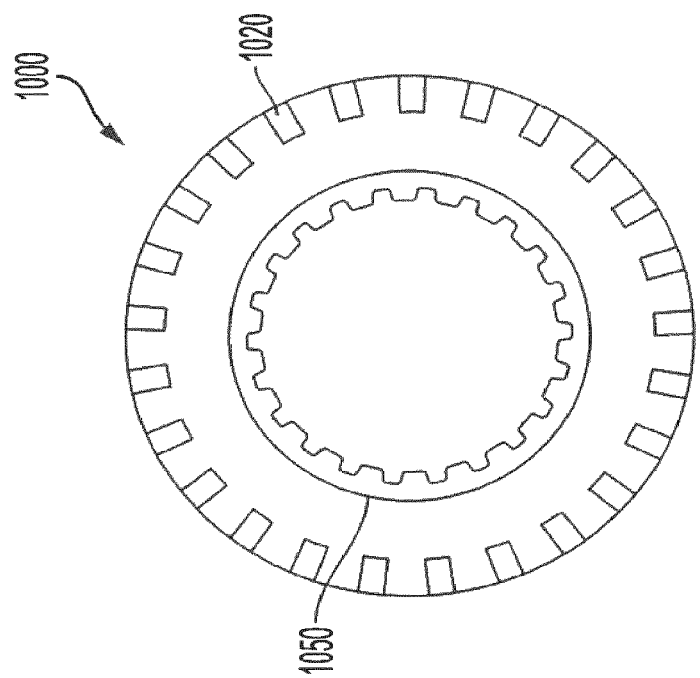
FIG. 7B is a plan view of a second side, opposite to the first side, of the first lock plate of FIG. 7A.
Figure 7A:
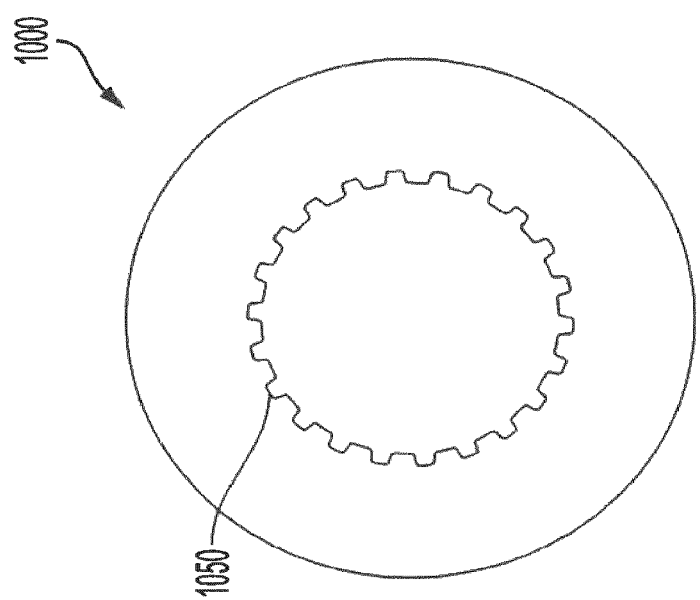
FIG. 7A is a plan view of a first side of a first lock plate.

Referring to FIGS. 7A and 7B, first lock plate 1000 can comprise internal splines 1050 (e.g., including teeth on an inner radial surface) configured to engage with the external splines of left side gear 200. First lock plate 1000 can also comprise a plurality of face teeth 1020 extending axially from a periphery of a side surface facing second lock plate 2000.

Figure 8B:
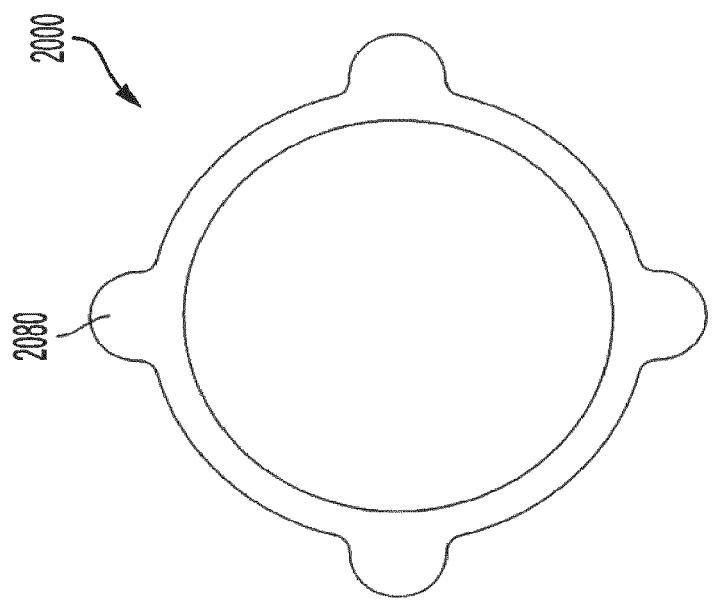
FIG. 8B is a plan view of a second side, opposite to the first side, of the second lock plate of FIG. 8A.
Figure 8A:
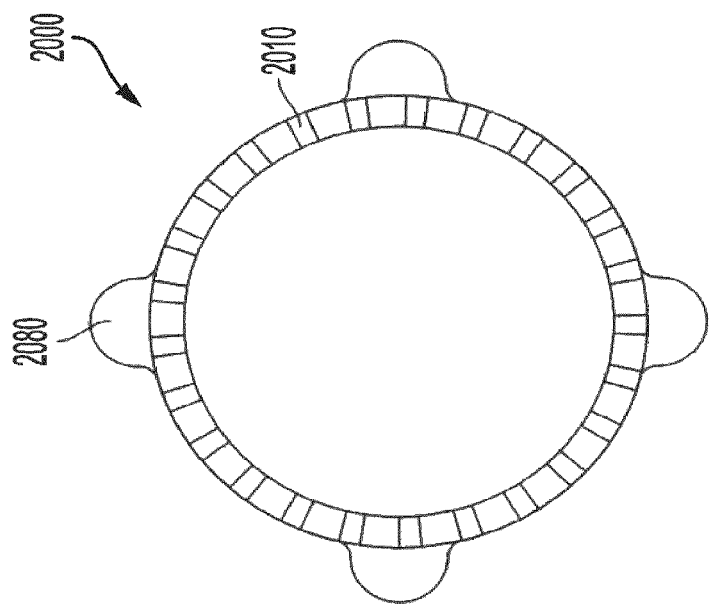
FIG. 8A is a plan view of a first side of a second lock plate.

Referring to FIGS. 8A and 8B, second lock plate 2000 can comprise a ring with a plurality of face teeth 2010 extending axially from a side surface facing first lock plate 1000. Face teeth 2010 of second lock plate 2000 can be sized and configured to mate with face teeth 1020 of first lock plate 1000. Second lock plate 2000 can also include a plurality of ears 2080 extending radially outwardly from its outer radial surface. Ears 2080 can fit into the guide grooves 3 formed in case 5 together with ears 12 of inactive clutch discs 10, 30 (see FIG. 5), so that second lock plate 2000 can be locked from rotating with respect to inactive clutch discs 10, 30 and case 5. The space between first lock plate 1000 and second lock plate 2000 can be sized such that ramps 360 of cam plate 300 can rest in valleys between ramps 260 of left side gear 200 in an unlocked mode (e.g., open mode). The spacing can be selected such that ramps 360 of camp plate 300 do not pass ramps 260 of left side gear 200 when cam plate 300 is locked. This design can enable positive locking such that differential 1 can operate either in a fully locked or unlocked mode.

Lock plates 1000 and 2000 serve as a positive locking element, whose torque carrying capacity is high with a lower axial width. If lock plates 1000 and 2000 are used alone, however, differential 1 may experience impact loading and the motor vehicle may experience locking jerk. To prevent such locking jerk and enable smooth locking action, the lockup mechanism can employ a synchronization mechanism comprising clutch packs 40, 50 and a disk spring 400. As an active clutch disc exponentially increases the axial force acting on a clutch pack, an active clutch disc 80, 20 can be used in clutch pack 50 and clutch pack 40 for right side gear 100 and left side gear 200, respectively, and each of clutch packs 40 and 50 uses a pair of externally ear-splined clutch discs 10, 30 and 70, 90, respectively, as an inactive clutch discs.

Figure 5:
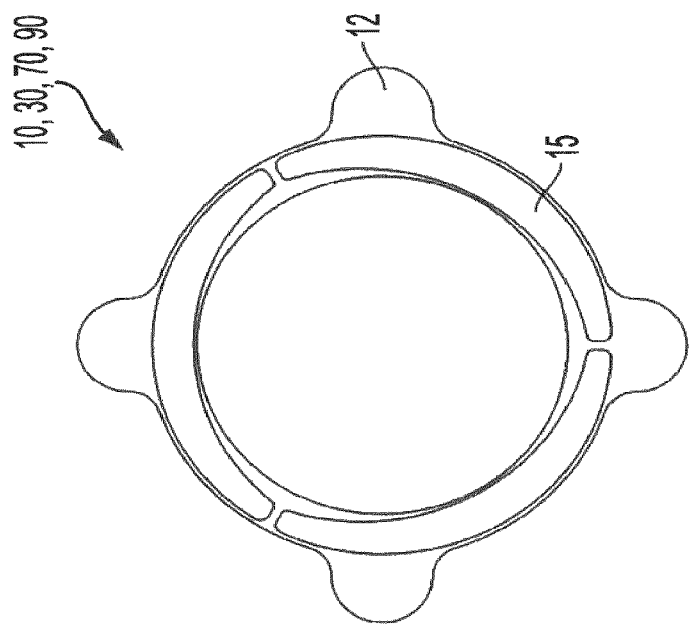
FIG. 5 is a plan view of an inactive disc with friction surfaces.

As shown in FIG. 5, each inactive clutch disc 10, 30, 70, 90 can comprise a plurality of ears 12 extending radially outwardly from its outer radial surface. Ears 12 can fit into guide grooves 7 formed in case 5 with optional guide clips (not shown), so that inactive clutch discs 10, 30, 70, 90 can rotate with case 5. In some exemplary embodiments, guide grooves 3 for receiving ears 2080 of lock plate 2000 and guide grooves 7 for receiving ears 12 of inactive clutch discs 10, 30 can be contiguous with or without step transitions to accommodate differences in dimensions. Alternatively, guide grooves 3 and guide grooves 7 can be provided separately.

Active clutch disc 20 can comprise splines 25 (e.g., including teeth on the inner radial surface) configured to engage the external splines on neck 330 of cam plate 300, so that active clutch disc 20 can rotate with cam plate 300. Similarly, active clutch disc 80 can be internally splined to external splines of right side gear 100, so that active clutch disc 80 can rotate with right side gear 100. Accordingly, on the right side of differential 1, inactive clutch disc 90 engages case 5 on a first side and engages active clutch disc 80 on a second side. Inactive clutch disc 70 engages right side gear 100 on a first side and engages active clutch disc 80 on a second side. On the left side of differential 1, inactive clutch disc 30 engages cam plate 300 on a first side and engages active clutch disc 20 on a second side. Inactive clutch disc 10 engages active clutch disc 20 on a first side and engages the non-toothed side of first lock plate 1000 on a second side. During the locking of differential 1, active clutch disc 20 moves along externa splines of neck 330 of cam plate 300 to contact inactive clutch discs 10 and 30, and active clutch disc 80 can move along external splines of right side gear 100 to contact inactive clutch discs 70 and 90. At least inactive discs 30 and 70 can move so that ears 12 can slide in the guide grooves 3 of case 5. Both side gears 100, 200 are then engaged by clutch packs 50 and 40, respectively.

According to one exemplary aspect, as shown in FIGS. 9A-9C, differential 2 can comprise a reaction block 600 configured to transfer force between right side gear 100 and left side gear 200. The reaction block 600 can also be included in differential 1 of FIG. 2 to engage and disengage clutch packs 40 and 50. In the disclosed exemplary embodiment, differential 2 can use a cross-shaft 160 having three uniformly-spaced arms 175 radially extended from a hub 170. Hub 170 can be an annular ring defining a center hole 165 configured to receive reaction block 600, as best shown in FIG. 9B. Reaction block 600 can be a two-piece construction of an identical thrust disc 610. For example, as shown in FIG. 9C, thrust disc 610 can have a shape of a curbed disc with its center portion protruded outwardly to form a narrower neck portion 620. Neck portion 620 can be sized and configured to be seated inside center hole 165 of cross-shaft 160 and can define a through-hole 650 in its center. As best shown in FIG. 9A, two thrust discs 610 can be arranged between right side gear 100 and left side gear 200 with their neck portions 620 seated inside center hole 165 of cross-shaft 160 and abutted against each other and with their wider flange portions 690 abutting against respective side gears 100 and 2000.

It should be understood that any other suitable reaction block known in the art, such as the reaction block described in U.S. Pat. No. 8,167,763, can be used alternatively to pass force between right side gear 100 and left side gear 200 in either differential 1 or differential 2. For example, the reaction block can be configured to provide an axial link between right side gear 100 and left side gear 200. In differential 1, force from left side gear 200 can be transferred through the reaction block to right side gear 100, which transfers the force to clutch pack 50. Similarly, force from right side gear 100 can be transferred through the reaction block to left side gear 200, which transfers the force to clutch pack 40. Accordingly, the reaction block can enable limited slip action.

In some exemplary embodiments, a reaction block can be omitted from differential 2. For example, dimensions of differential 2 can allow placing inactive clutch discs from clutch pack 50 on right side gear 100 to clutch pack 40 on left side gear 200. This results in a combination of clutch pack 40 with clutch pack 50. One of the inactive discs 30, 70 can be omitted, while keeping the total number of active clutch discs 20, 80 the same. In these cases, the combined clutch pack 40+50 is on one side of differential 2, no right hand clutch pack is used, and a reaction block can be omitted. This provides a smaller and light weighted differential.

Because the non-toothed side of lock plate 2000 engages with inactive clutch disc 10, an additional friction surface can be provided between cam plate 300 and lock plates 1000, 2000. Likewise, an additional friction surface can be provided between cam plate 300 and inactive clutch disc 30. In one exemplary embodiment, friction surfaces can be provided on one or both of the non-toothed side of lock plate 1000 and on cam plate 300 on the side facing inactive clutch disc 30. The friction surface can comprise, for example, a knurled pattern on a metal surface. In an alternative embodiment, a friction surface can be provided by treating a surface or by applying a friction material. For example, as shown in FIG. 5, inactive clutch discs 10, 30, 70, 90 can be provided with a carbon friction material applied to a metal surface. Active clutch discs 20, 80 can also be untreated or provided with a friction surface depending on the application. Differential locking and transfer of whole torque via friction can be enhanced in a smooth manner in a small footprint.

The synchronization mechanism can further comprise disk spring 400, such as, for example, a Belleville washer, disposed between lock plates 1000, 2000 and an internal wall of case 5. As the engagement of lock plates 1000 and 2000 require them to move axially, a reaction force needs to be generated against the ramping of cam plate 300. Disc spring 400 can deflect and generate a spring reaction force with small or limited deflection towards lock plates 1000 and 2000 against the ramping of cam plate 300.

While various operational characteristics of clutch packs 40, 50 with lock plates 1000, 2000 are evident from the description above, certain exemplary operational characteristics will be briefly described herein. During normal, straight-ahead operation of a motor vehicle (e.g., with little or no differentiating action occurring), the cam surface of left side gear 200 and the cam surface of cam plate 300 remain in a neutral position (i.e., no ramping) with cam plate 300 rotating with side gear 200 at the same rotational speed.

Under certain operating condition (e.g., the difference in rotational speed between side gear 100 and side gear 200 exceeding above about 100 RPM), actuator 500 can apply torque to external teeth 310 of cam plate 300. The application of torque to external teeth 310 exceeding a predetermined level retards the rotation of cam plate 300 relative to left side gear 200 and causes the ramping of the cam surface of cam plate 300 and the cam surface of left side gear 200.

The ramping of cam plate 300 causes cam plate 300 to move axially away from left side gear 200 and towards clutch pack 40 and lock plates 1000 and 2000. At the same, in response to the ramping of cam plate 300, disc spring 400 deflects and creates very high axial reaction force against the force exerted by cam plate 300. Due to the axial reaction force, the axial movement of cam plate 300 can apply pressure to clutch pack 40. The pressure applied to clutch pack 40 causes engagement between active disc 20 and inactive discs 10 and 30 (e.g., "loaded" condition). Since active disc 20 is in spline engagement with the outer splines on neck 330 of cam plate 300, clutch pack 40 in the loaded condition causes the speed difference between left side gear 200 and case 5 to reduce.

As disc spring 400 deflects by a certain amount, disc spring 400 can create enough axial force to reduce a speed difference between first lock plate 1000 and second lock plate 2000 to a level at which they can engage with each other, creating a complete locking of differential 1. For example, the axial force causes first lock plate 1000 and second lock plate 2000 to move axially towards one another, so that face teeth 1020 of first lock plate 1000 mate and lock with face teeth 2010 of second lock plate 2000. Since first lock plate 1000 is in spline engagement with the outer splines of side gear 200, and second lock plate 2000 is locked with case 5 via ears 2080 fitted into the guide grooves 3 of case 5, the locking between first lock plate 1000 and second lock plate 2000 effectively prevents relative rotation between case 5 and side gear 2000, thus retarding differentiating action between side gears 100 and 200.

For unlocking, when left side gear 200 experiences torque reversal because of the lash that clutch packs 40 and lock plate 1000 have with respect to left side gear 200, side gear 200 rotates in an opposite direction than that of the locking direction. At the same time, cam plate 300 rotates with left side gear 200. This will reduce the axial force provided by disc spring 400 and causes lock plates 1000 and 2000 to disengage from one another.

Other implementations will be apparent to those skilled in the art from consideration of the specification and practice of the examples disclosed herein.

What is claimed is:

1. A differential comprising:
   a case;
   a side gear;
   a lockout mechanism comprising:
   a first lock plate comprising a first side and a toothed side;
   a second lock plate comprising a first side facing the case and a toothed second side facing the toothed side of the first lock plate;
   a cam plate axially between the side gear and the first lock plate; and a clutch pack axially between the cam plate and the first lock plate; and an engagement mechanism configured to actuate the cam plate to rotate.

2. The differential of claim 1, wherein the engagement mechanism comprises a pair of flyweights spring-loaded on a first shaft that is meshed and rotates with external teeth of the cam plate.

3. The differential of claim 2, wherein the pair of flyweights is configured to engage a pawl of the lockout mechanism disposed on a second shaft.

4. The differential of claim 3, wherein one of the pair of flyweights is configured to to engage the pawl in a first direction of rotation and the other one of the pair of flyweights is configured to engage the pawl in a second, opposite direction.

5. The differential of claim 1, further comprising a disc spring disposed between the first lock plate and an internal wall of the case configured to generate a spring reaction force towards the pair of lock plates against the ramping of the cam plate.

6. The differential of claim 5, wherein the disc spring is a Belleville washer.

7. The differential of claim 5, wherein the disc spring is configured to create enough axial force to reduce a speed difference between the first lock plate and the second lock plate to a level at which they can engage with each other.

8. The differential of claim 1, further comprising a pinion shaft and one or more pinion gears rotatably mounted on the pinion shaft.

9. The differential of claim 8, wherein the pinion shaft is attached to the case, wherein the one or more pinion gears are meshed with the side gear and configured to transfer differentiated or undifferentiated torque to the meshed side gear.

10. The differential of claim 8, wherein the pinion shaft is a cylindrical rod.

11. The differential of claim 8, wherein the pinion shaft is a cross-shaft having a number of arms corresponding to the number of pinion gears mounted on the cross-shaft.

12. A differential comprising:
a case;
a side gear;
a lockout mechanism comprising:
a first lock plate comprising a first side and a toothed side;
a second lock plate comprising a first side facing the case and a toothed second side facing the toothed side of the first lock plate;
a cam plate axially between the side gear and the first lock plate; and
a clutch pack axially between the cam plate and the first lock plate; and
a cross-shaft attached to the case having a number of arms radially extending from a hub.

13. The differential of claim 12, wherein the cross-shaft comprises three uniformly-spaced arms.

14. The differential of claim 12, further comprising a reaction block, wherein the hub is an annular ring defining a center hole configured to receive the reaction block.

15. The differential of claim 14, wherein the reaction block comprises a thrust disc having a neck portion configured to be seated inside the center hole.

16. The differential of claim 15, wherein the thrust disc comprises a flange portion coupled to the neck portion and configured to abut against the side gear.

* * * * *